United States Patent [19]
Klinger et al.

[11] Patent Number: 5,723,821
[45] Date of Patent: Mar. 3, 1998

US005723821A

[54] MOUSE CORD CONTROL DEVICE

[76] Inventors: Robert C. Klinger, 311 Shady Nook Rd., Harleysville, Pa. 19438; Troy E. Bergstrom, 130 Township Rd., Macungie, Pa. 10862

[21] Appl. No.: 481,813

[22] Filed: Jun. 7, 1995

Related U.S. Application Data

[63] Continuation-in-part of Ser. No. 106,579, Aug. 16, 1993, abandoned.

[51] Int. Cl.⁶ .................................................. A46B 17/02
[52] U.S. Cl. ............................ 174/135; 248/51; D19/56
[58] Field of Search .......................... 174/135, 72 A; 24/67.9, 67.11, 336, 457, 531; 248/51, 52, 231.81, 316.7; D19/56

[56] References Cited

U.S. PATENT DOCUMENTS

| | | | |
|---|---|---|---|
| D. 206,783 | 1/1967 | McCormick | D20/43 |
| 344,567 | 6/1886 | Coleman | 24/336 X |
| D. 350,947 | 9/1994 | Klinger et al. | D14/114 |
| 884,256 | 4/1908 | Addie | 248/229.26 |
| 1,064,788 | 6/1913 | Terry | 24/457 |
| 1,481,984 | 1/1924 | Carnett | 24/11 PP |
| 2,523,185 | 9/1950 | Bedford, Jr. | 248/71 |
| 3,105,279 | 10/1963 | Westhoff | 24/67.5 |
| 3,911,531 | 10/1975 | Buturuga | 24/10 R |
| 4,100,652 | 7/1978 | Carlson | 24/3.1 |
| 4,121,798 | 10/1978 | Schumacher et al. | 248/113 |
| 5,022,124 | 6/1991 | Yiin | 24/67.9 |
| 5,066,154 | 11/1991 | Renaud | 401/131 |
| 5,184,375 | 2/1993 | Hoyt | 24/3.12 |

FOREIGN PATENT DOCUMENTS

| | | |
|---|---|---|
| 888662 | 12/1943 | France. |
| 1024880 | 4/1953 | France. |
| 414251 | 6/1925 | Germany. |

OTHER PUBLICATIONS

Forminco, 1989, 1990, 1991 4 pages.
Article "Eliminate the Mouse Mess" from *BYTE* Magazine (Jul. 1992).

*Primary Examiner*—Hyung S. Sough
*Attorney, Agent, or Firm*—Miller & Christenbury

[57] ABSTRACT

A device for controlling the movement of an electrical cord which connects a computer mouse to a computer. The mouse cord holder includes of a shackle for frictionally engaging the mouse cord and a mounting device. The mouse cord is secured to the shackle and the mounting device is attachable to stationary objects such as mouse pads or desk tops. The device limits the movement of a computer mouse cord to a length necessary to operate a computer mouse while restraining the remaining mouse cord length thereby preventing the length of the cord between the computer mouse and computer from causing spills or cord entanglement.

8 Claims, 9 Drawing Sheets

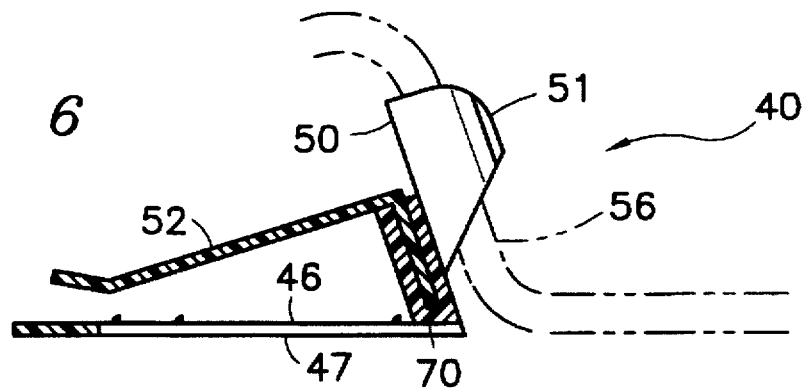
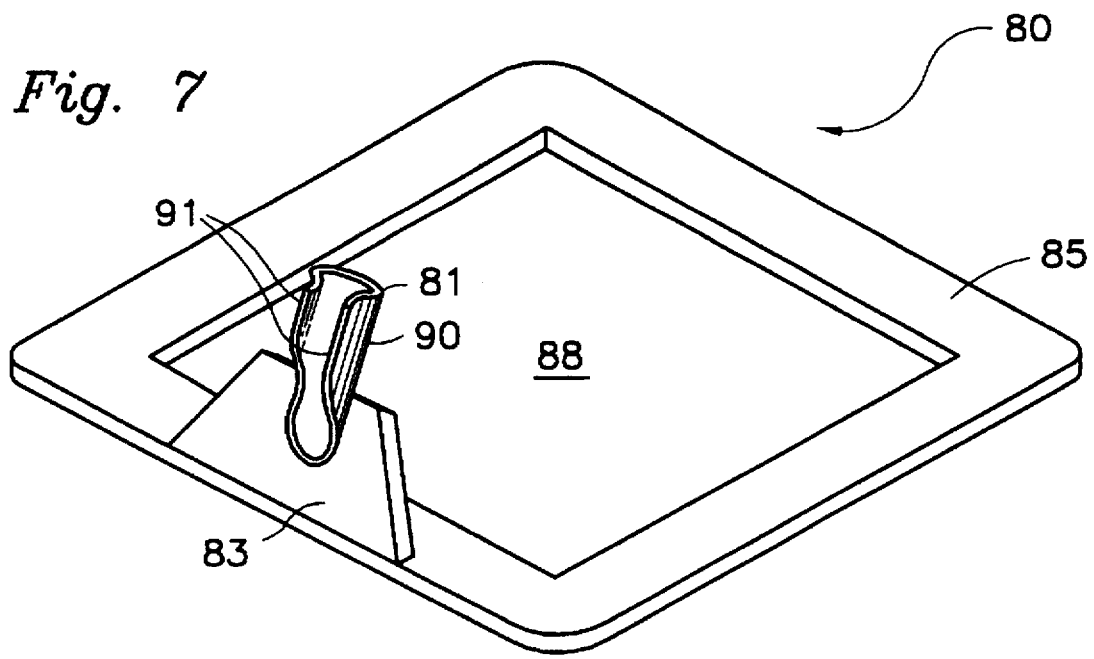

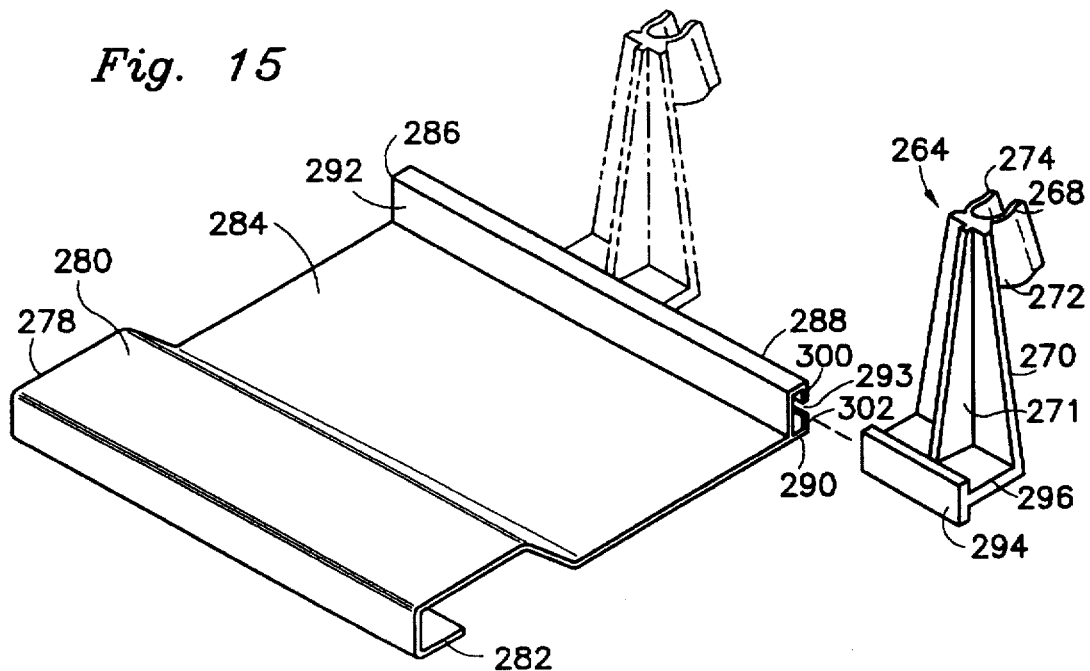
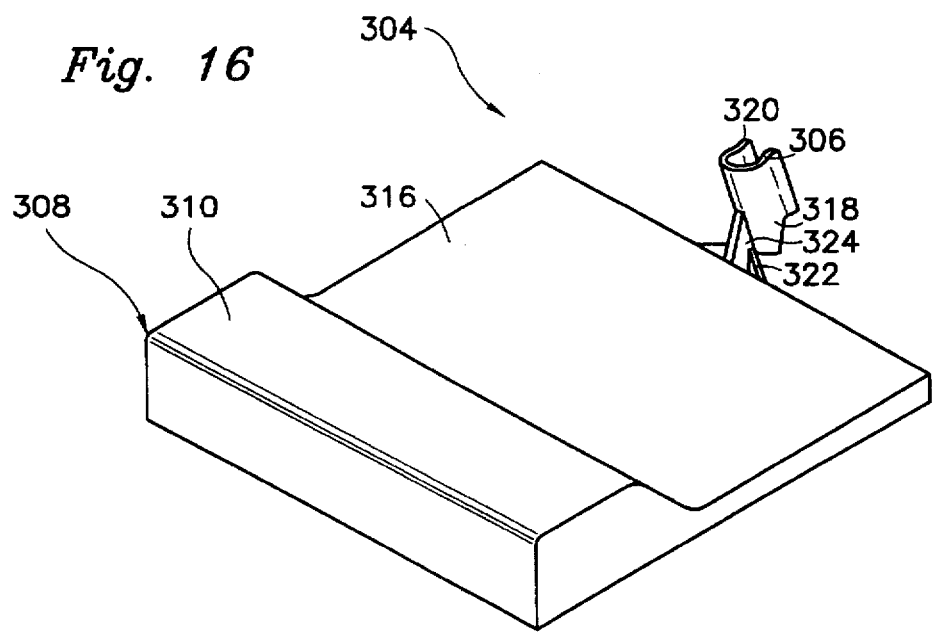

MOUSE CORD CONTROL DEVICE

This application is a continuation-in-part of application Ser. No. 08/106,579 filed Aug. 16, 1993 now abandoned.

BACKGROUND OF THE INVENTION

The present invention relates to computer equipment and, more particularly, to a device for controlling excess computer mouse cord connecting a computer mouse to a computer.

A computer mouse is connected to a computer by an electrical cord. The cord is constructed to be long enough for the computer end of the cord to be plugged into the back of a computer while the mouse end of the cord extends to the front of the computer where it is attached to a mouse. This allows a computer operator to manipulate a mouse near the front of the computer while the operator observes the computer video display.

Computer mice are designed so that movement of a mouse corresponds to movement of a pointer shown on a computer's video display. It is only necessary to move a portion of the total mouse cord's length when moving the mouse in order to move the pointer within the bounds of the video display; however, since there is no impediment to movement of the mouse cord, when the mouse is moved even a short distance, nearly the entire length of the mouse cord also moves. It is a common problem that movement of the computer mouse by the computer operator causes the unfettered mouse cord to entangle with other computer wiring and electrical cords. It is also a common problem that mouse cord movement sweeps pencils, papers, coffee cups, and other common items off of computer tables and desks. Entanglement of mouse cord with computer wiring and sweeping of items off of desks are distractions which interrupt computer operators during their work resulting in frustrated computer operators and time lost to untangling cords and cleaning up spills.

Thus, a need exists for a device which limits mouse cord movement to a length of mouse cord necessary to operate a computer mouse yet restrains the movement of the remaining length of mouse cord to prevent cord tangling and spills.

Accordingly, it is an object of the present invention to provide a device which limits mouse cord movement to a length of mouse cord necessary to operate a computer mouse while restraining the movement of the remaining length of mouse cord to prevent mouse cord tangling and mouse cord caused spills.

SUMMARY OF THE INVENTION

To achieve the foregoing and other objects of and in accordance with the purposes of the present invention as embodied and broadly described herein, the device comprises a frictional engaging means for attaching a computer mouse cord at a point along the length of the cord to operate the computer mouse that allows movement of the length of the cord extending from the frictional engaging means to the computer mouse while restraining the length of the cord between the computer mouse and computer; thereby preventing the length of the cord between the computer mouse and computer from causing spills or cord entanglement. The frictional engaging means is attached to a mounting means for mounting the device on a stationary object and is also elevated on the mounting means to prevent the cord section between the computer mouse and computer from rubbing against the supporting surface thereby allowing easier movement of the mouse by a computer operator. The frictional engaging means also increases the tension in the cord between the computer and computer mouse and thus, prevents the cord from falling off the supporting surface during mouse movement.

In one possible embodiment of the present invention, the frictional engaging means comprises a shackle for attachment to the mouse cord. The shackle is comprised of a partially cylindrical body. The shackle may preferably have flared lips extending horizontally along the cylindrical body. The mounting means maybe attached to the shackle for mounting the device on a stationary object. Another possible embodiment of the present invention includes a device wherein the mounting means may include a support member attached to the shackle; a top member attached to the support member comprised of a plate having an angled flange; a base member attached to the support member, the base member having a top side, a bottom side, and a cut out portion; and a plurality of studs projecting from the top side of the base member.

The support member may also have a receptacle means and the top member may further be comprised of an insertable member attached to the plate. The insertable member of said top member may be thereby engageable with the receptacle means of the support member.

Additionally, the mounting means may also be comprised of a support member attached to the shackle, and a base member attached to the support member, with the base member having a cut-out portion.

Alternatively, the mounting means includes a spacing means attached to the shackle; a support member attached to said spacing means; a top member attached to said support member; said top member comprised of a plate having an angled flange; a base member attached to said support member, said base member having a top side, a bottom side and a cut-out portion; and a plurality of studs projecting from said top side of said base member.

In another embodiment of the present invention, the frictional engaging means includes a book member having an upper portion folded over and detachably secured to a lower portion. The book member has an opening located between the upper and lower portions and extending between opposite edges of the book member for securely receiving the cord.

The frictional engaging means may alternatively include a hook and pile fastener whereby a layer of pile is disposed on a portion of the cord and a layer of hooks is attached to an upright pad which is attached to the mounting means. The cord is secured to the upright pad when the layer of pile is pressed to the layer of hooks.

In another embodiment of the present invention, the frictional engaging means may include a yoke member comprising a U-shaped upper portion having opposing arms, and a lower leg secured to the mounting means. The cord is inserted into the upper portion and is prevented from moving up and out of the upper portion by a pair of inwardly extending protrusions which may be integrally formed with an arm.

The frictional engaging means may also include upper, middle, and lower trough members constructed and arranged to form a channel for securely receiving the mouse cord.

In yet another embodiment of the present invention, the frictional engaging means may include a plate extending upwardly and having a lateral extension folded over the plate and detachably secured thereto. The extension has an outwardly projecting hump defining an opening for securely receiving the mouse cord.

Moreover, the shackle may be integrally formed with the mouse pad. Alternatively, the shackle may be detachably secured to the mouse pad by utilizing a track member on the rear end of the mouse pad that slidably receives an engageable member attached to the shackle.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 6 is a partially cut-away, cross-sectional view taken along line 6—6 of the device depicted in FIG. 4 illustrating the shackle attached to a partially cut-away portion of mouse cord;

FIG. 7 is a perspective view depicting an embodiment of the device of the present invention.

FIG. 12 is a perspective view of another embodiment of the device of the present invention.

FIG. 15 is a perspective view depicting another embodiment and illustrating the shackle being removably attached to the mounting means.

FIG. 16 is a perspective view depicting another embodiment of the device of the present invention.

DETAILED DESCRIPTION OF THE PREFERRED EMBODIMENTS

Figure 1:
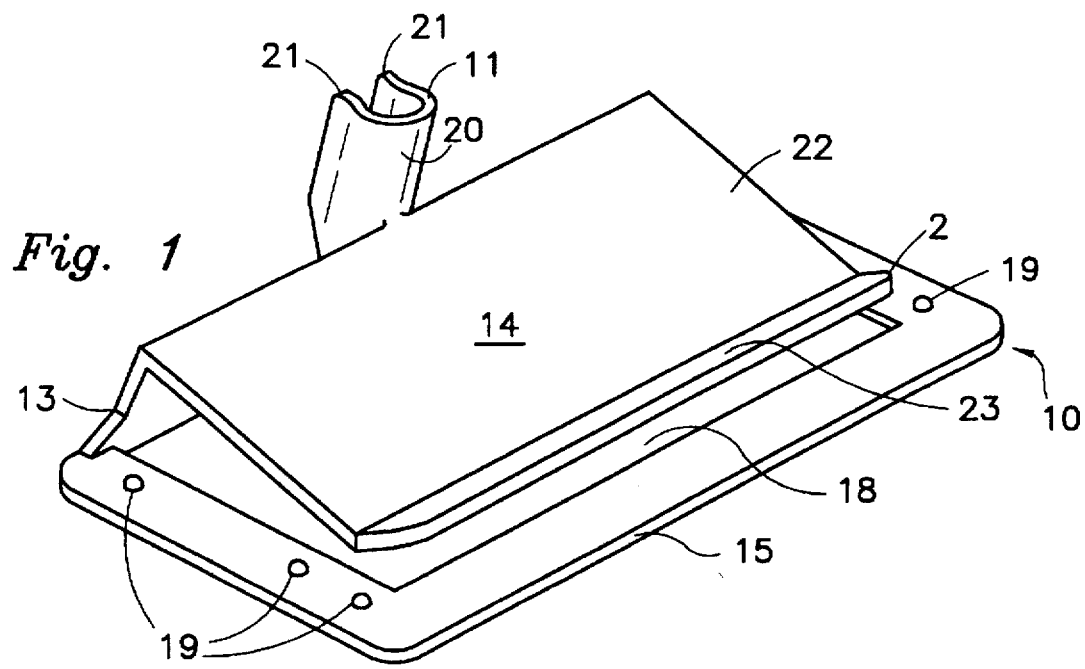
FIG. 1 is a perspective view depicting an embodiment of the device of the present invention.

It will be appreciated that the following description is intended to refer to the specific forms of the invention selected for illustration in the drawings, and is not intended to define or limit the inventory other than in the appended claims.

Figure 2:
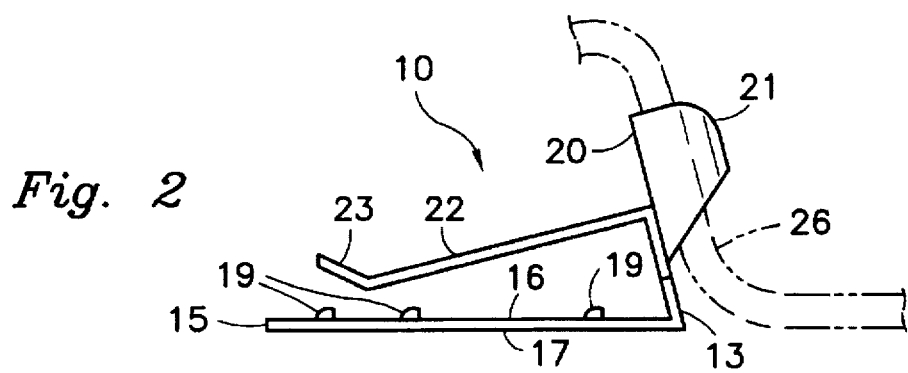
FIG. 2 is a side view of the device depicted in FIG. 1 illustrating the shackle attached to a partially cut away portion of mouse cord.
Figure 3:
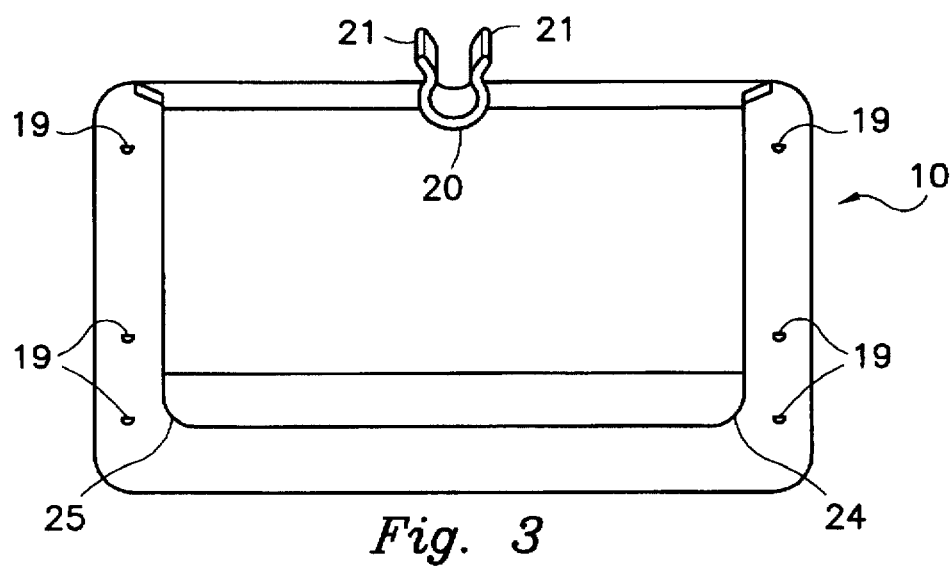
FIG. 3 is a top view of the device depicted in FIG. 1.

The mouse cord controlling device of this invention is depicted generally as 10 in FIGS. 1, 2, and 3. The device includes a frictional engaging means for attaching a computer mouse cord at a point along the length of the cord to operate the computer mouse in a manner that allows movement of the length of the cord extending from the frictional engaging means to the computer mouse while restraining the length of the cord between the computer mouse and computer. This prevents the length of the cord between the computer mouse and computer from causing spills or cord entanglement. The frictional engaging means is attached to a mounting means for mounting the device on a stationary object and is elevated on the mounting means to prevent the cord section between the computer mouse and computer from rubbing against the supporting surface thereby allowing easier movement of the mouse by a computer operator. The frictional engaging means also increases the tension in the cord between the computer and computer mouse and thus, prevents the cord from falling off the supporting surface during mouse movement.

As shown in FIG. 1, device 10 is comprised of a shackle 11 attached to a mounting means. The mounting means is comprised of a support member 13 attached to shackle 11, top member 14 attached to support member 13, and base member 15 attached to support member 13. Base member 15 has a top side 16, a bottom side 17, a cut-out section 18, and a plurality of studs 19 projecting from top side 16. Base member 15 is attached to support member 13 at an acute angle as shown in FIG. 2.

Shackle member 11 is comprised of partially cylindrical body 20 which may have flared lips 21 extending longitudinally along the body 20 as shown in FIGS. 1 and 3. The cylindrical body may be for example hexagonal, octagonal or any other generally cylindrical shape. Top member 14 is comprised of plate 22 having flange 23. Plate 22 is attached perpendicularly to support member 13 and flange 23 is attached at an obtuse angle to plate 22 as shown in FIGS. 1 and 2. Flange 23 may have beveled corners 24 and 25 as shown in FIG. 3 to prevent possible injury to device users from sharp flange corners. Device 10 is utilized by mounting device 10 onto stationary objects such as a mouse pad by sliding the mouse pad between base member 15 and top member 14. The obtuse angled attachment of flange 23 to plate 22 allows for easy passage of the mouse pad between base member 15 and top member 14 while studs 19 act as barbs on the underside of an inserted mouse pad to frictionally secure the mouse pad between base member 15 and top member 14.

Studs 19 are shown in FIGS. 1–3 as semi-conical projections; however, the studs can be any projecting shape so long as they frictionally secure mouse pads between base member 15 and top member 14. Mouse cord 26 is then inserted between lips 21 and into partially cylindrical shackle body 20 to secure mouse cord 25 to device 10 as shown in FIG. 2.

Device 10 may be constructed of resilient polymeric materials or metals, permitting top member 14 and base member 15 to flex apart so that mouse pads of various thicknesses can be inserted between top member 14 and base member 15. This allows repeated insertion of mouse cord into shackle 11. Device 10 can also be utilized without a mouse pad by mounting the device on a stationary surface such as on a desk top or on a computer table by glue or by other affixing means and then inserting the mouse cord into the device's shackle to restrain the excess mouse cord. Thus, device 10 allows a computer mouse user to move the length of mouse cord extending from the shackle to the mouse which is necessary to operate a computer mouse while controlling the movement of excess cord extending from the shackle to the back of the computer, thereby preventing the excess cord from causing spills and cord entanglement when the computer mouse is moved.

Figure 4:
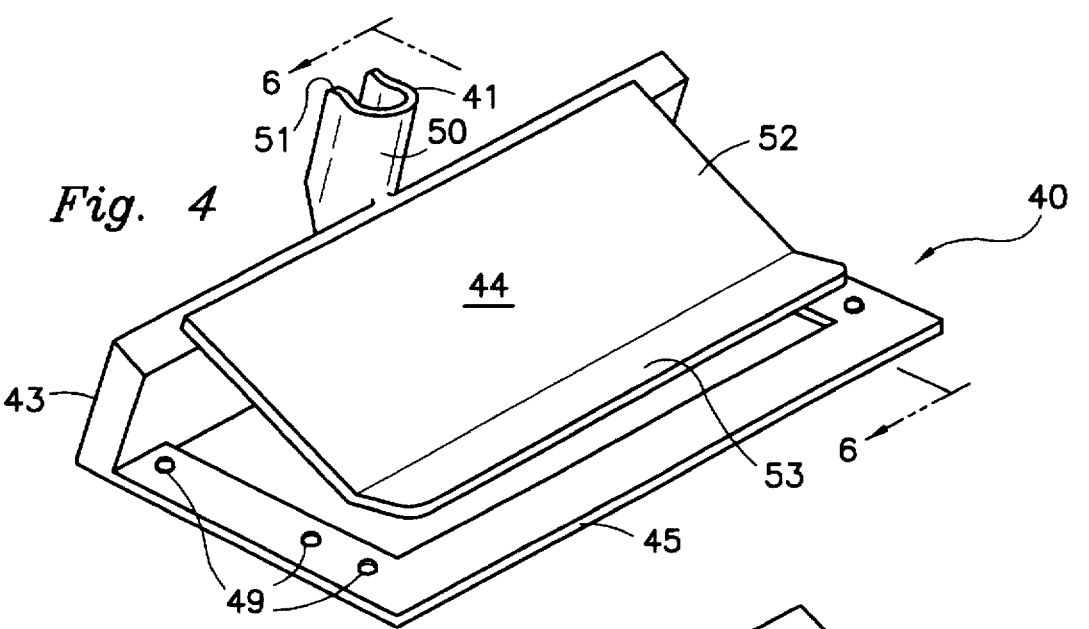
FIG. 4 is a perspective view depicting an embodiment of a device of the present invention.
Figure 5:
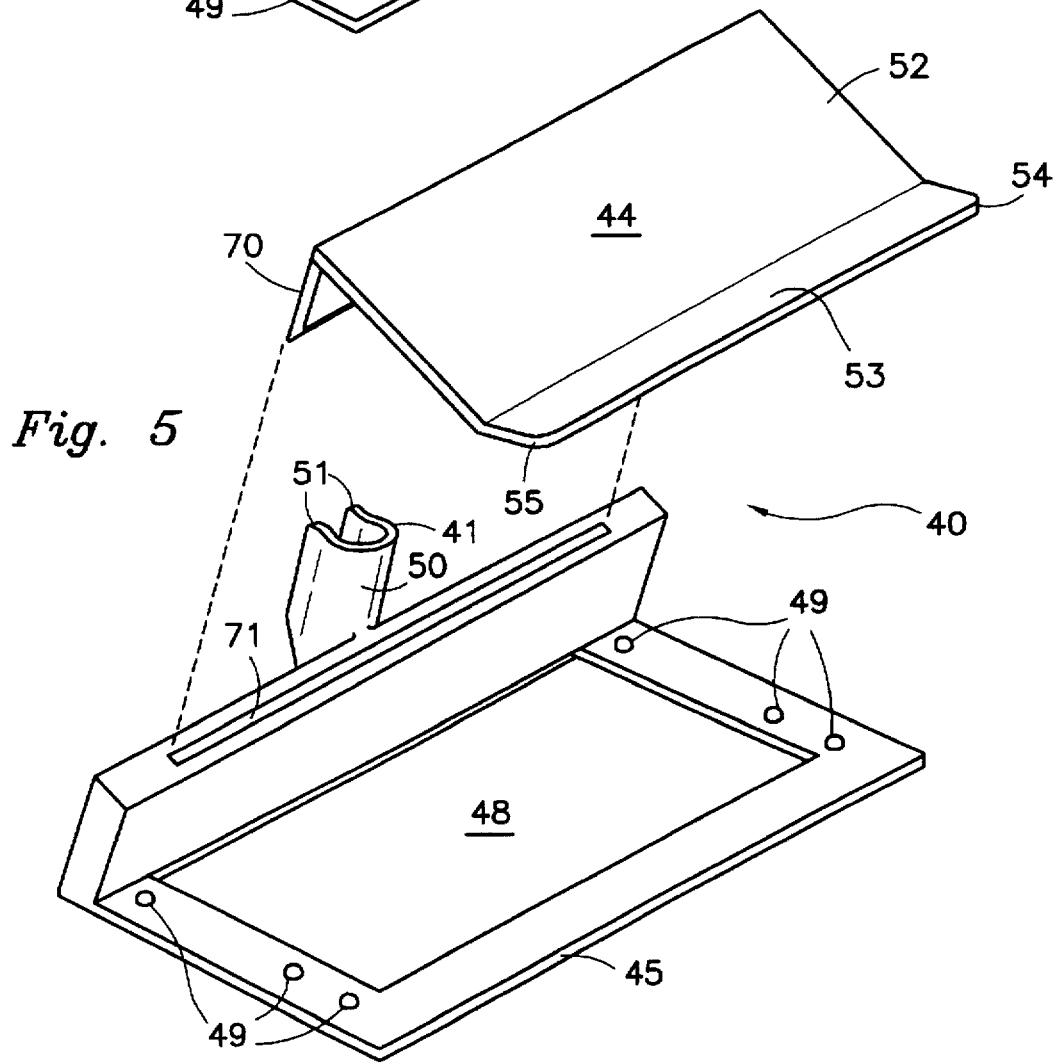
FIG. 5 is a is an exploded perspective view of the device depicted in FIG. 4.

Another embodiment of this invention is shown generally as device 40 in FIGS. 4–6. Device 40 is comprised of a shackle 41 attached to a mounting means comprising a support member 43 attached to shackle 41, a top member 44 attached to support member 43, and a base member 45 attached to support member 43. Base member 45 has a top side 46, a bottom side 47, a cut-out section 48, and a plurality of studs 49 projecting from top side 46 of base member 45 as shown in FIGS. 5 and 6. Base member 45 is attached to support member 43 at an acute angle. Shackle 41 may be comprised of a partially cylindrical body 50 having flared lips 51 extending longitudinally on body 50 as shown in FIGS. 4, 5, and 6. Top member 44 is comprised of plate 52 having flange 53, and insertable member 70. Flange 53 is attached at an obtuse angle to plate 52 and has beveled corners 54 and 55 as shown in FIG. 5 to prevent injury to device users from sharp flange corners. Plate 52 is attached perpendicularly to insertable member 70 as shown in FIGS. 5 and 6. Support member 43 has a receptacle 71 which is engageable with insertable member 70 of top member 44.

Device 40 is utilized by mounting device 40 on a stationary object such as onto a mouse pad by sliding the mouse pad between base member 45 and top member 44. The obtuse angled attachment of flange 53 to plate 52 allows for easy passage of the mouse pad between base member 45 and top member 44 while studs 49 act as barbs on the underside of the inserted mouse pad to frictionally secure the mouse pad between base member 45 and top member 44. Studs 49 are shown in FIGS. 4 and 5 as conical projections; however, the studs can be any projecting shape so long as they frictionally secure mouse pads between base member 45 and top member 44. Mouse cord 56 is then inserted between lips 51 and into partially cylindrical shackle body 50 to secure mouse cord 56 to device 40 as shown in FIG. 6.

Support member 43 and base member 45 may both be constructed of resilient polymeric material or metals. Top member 44 may be constructed of either resilient metal or of resilient polymeric material, permitting top member 44 and base member 45 to flex apart so that stationary objects of various thicknesses can be inserted between top member 44 and base member 45 to allow repeated insertion of mouse cord into shackle 41. Device 40 can be utilized without a mouse pad by affixing the device to a surface by gluing or other affixing means and inserting mouse cord into the device shackle to restrain the excess cord. Thus, device 40 allows a user to utilize a length of mouse cord needed to operate a computer mouse while restraining the remaining length of the mouse cord as described above. Device 40 also provides for a separable two-piece design which facilitates attachment of labels and allows printing or engraving on plate 52.

Figure 8:
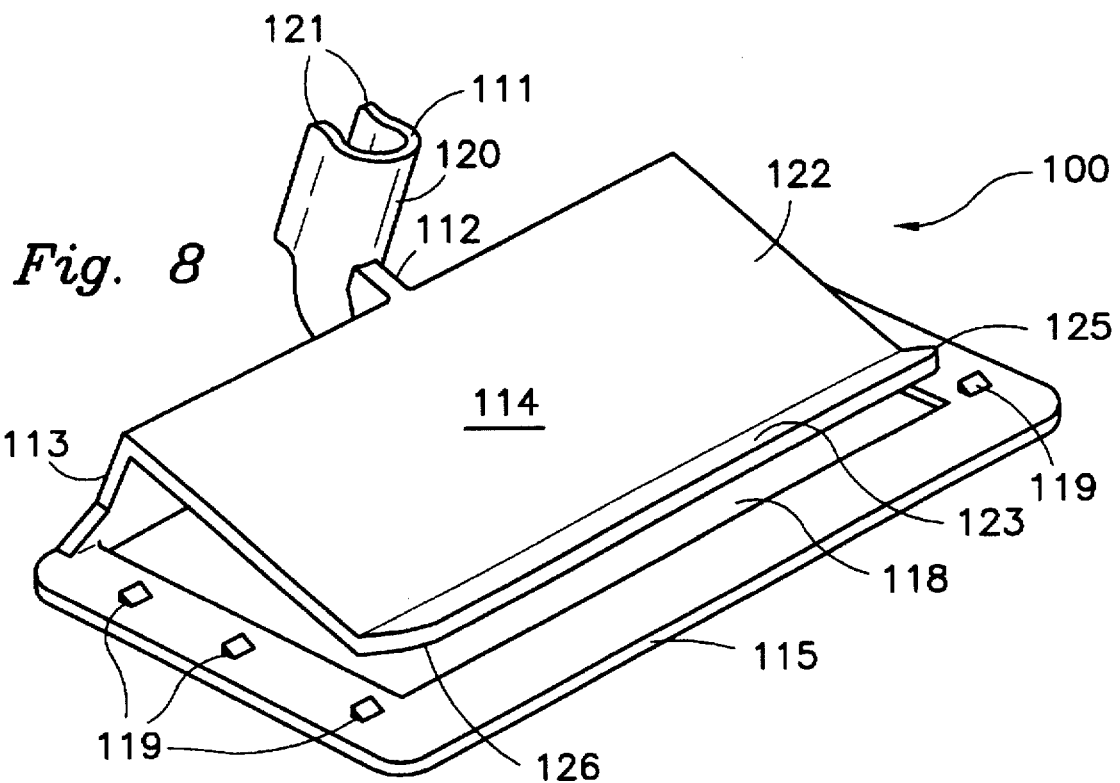
FIG. 8 is a perspective view depicting an embodiment of the device of the present invention.
Figure 9:
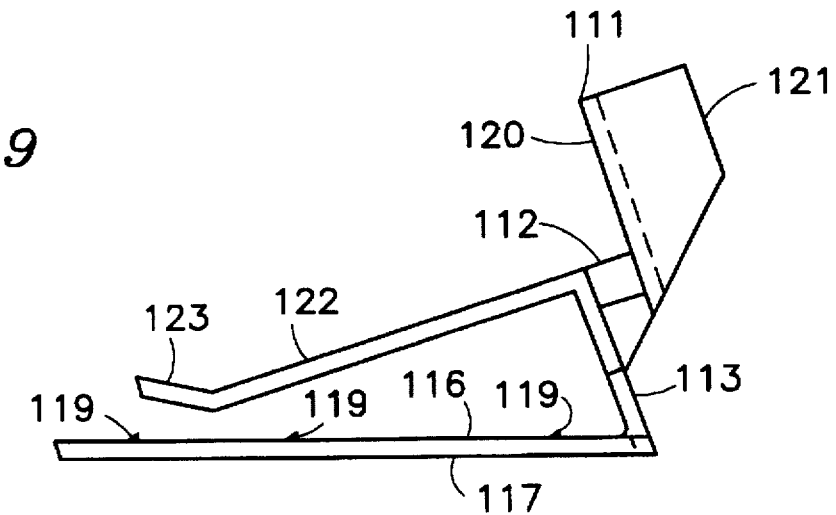
FIG. 9 is a side view of the device depicted in FIG. 8.

Another embodiment of this invention is shown generally as device 100 in FIGS. 8 and 9. Device 100 is comprised of a shackle 111 attached to a mounting means comprising a spacing means 112 attached to shackle 111, a support member 113 attached to spacing means 112, a top member 114 attached to support member 113, and a base member 115 attached to support member 113. Base member 115 has a top side 116, a bottom side 117, a cut-out portion 118, and a plurality of studs 119 projecting from top side 116 of base member 115 as shown in FIGS. 8 and 9. Base member 115 is attached to support member 113 at an acute angle as shown in FIG. 9. Shackle 111 may be comprised of a partially cylindrical body 120 having flared lips 121 extending longitudinally on body 120. Top member 114 is comprised of plate 122 having flange 123. Flange 123 is attached to an obtuse angle to plate 122 and has beveled corners 125 and 126 to prevent injury to device users from sharp flange corners. Plate 122 is attached perpendicularly to support member 113 as shown in FIG. 9.

Device 100 is utilized by mounting device 100 onto stationary objects, such as a mouse pad, by sliding the object between base member 115 and top member 114. The obtuse angled attachment of flange 123 to plate 122 allows for easy passage of the stationary object between base member 115 and top member 114 while studs 119 act as barbs on the underside of the object to frictionally secure it between base member 115 and top member 114. Studs 119 are shown in FIGS. 8–9 as triangular projections; however, the studs can be any projecting shape so long as they frictionally secure the object between base member 115 and top member 114. A mouse cord is then inserted between lips 121 and into partially cylindrical shackle body 120 to secure the mouse cord to device 100.

Device 100 may be constructed of resilient polymeric materials or metals permitting top member 114 and base member 115 to flex apart so that objects of various thicknesses can be inserted between top member 114 and base member 115 and to allow repeated insertion of mouse cord into shackle 111.

Device 100 can also be utilized without a mouse pad by mounting the device on a stationary surface such as on a desk top or on a computer table by glue or by other affixing means and then inserting the mouse cord into the device's shackle to restrain the excess mouse cord. Thus, device 100 allows a computer mouse user to move the length of mouse cord extending from the shackle to the mouse, which is necessary to operate a computer mouse, while controlling the movement of excess cord extending from the shackle to the back of the computer. This prevents the excess cord from causing spills and cord entanglement when the computer mouse is moved. The purpose of spacer 112 is to make top member 114 accessible for the attachment of labels or to facilitate printing or engraving of top member 114 while maintaining a unitary device design.

Yet another embodiment of this invention is depicted in FIG. 7 and shown generally as device 80. Device 80 is comprised of a shackle 81 attached to a mounting means comprising a support member 83, attached to shackle 81, and a base member 85 attached to support member 83. Base member 85 has a cut out section 88 and is attached to support member 83 at an acute angle. Shackle 81 may be comprised of a partially cylindrical body 90, having flared lips 91 extending longitudinally on body 90 as shown in FIG. 7. Device 80 may be attached to a mouse pad or other stationary object by adhering base member 85 to the bottom side of a mouse pad by adhesive strips, tape, or glue (not shown in the drawings). Device 80 may also be attached to a mouse pad by positioning a mouse pad within cut-out section 88 such that base member 85 frames the mouse pad (not shown in the drawings). Device 80 can also be affixed to a surface such as a desk top by glue or by other affixing means (not shown in the drawings).

Device 80 is utilized by inserting mouse cord between lips 91 and into partial cylindrical shackle body 90 to secure the mouse cord to device 80 after base member 85 has been affixed to a stationary surface. Device 80 is also comprised of resilient materials such as metal or polymeric materials and allows repeated insertion of mouse cord into shackle 81.

Figure 10:
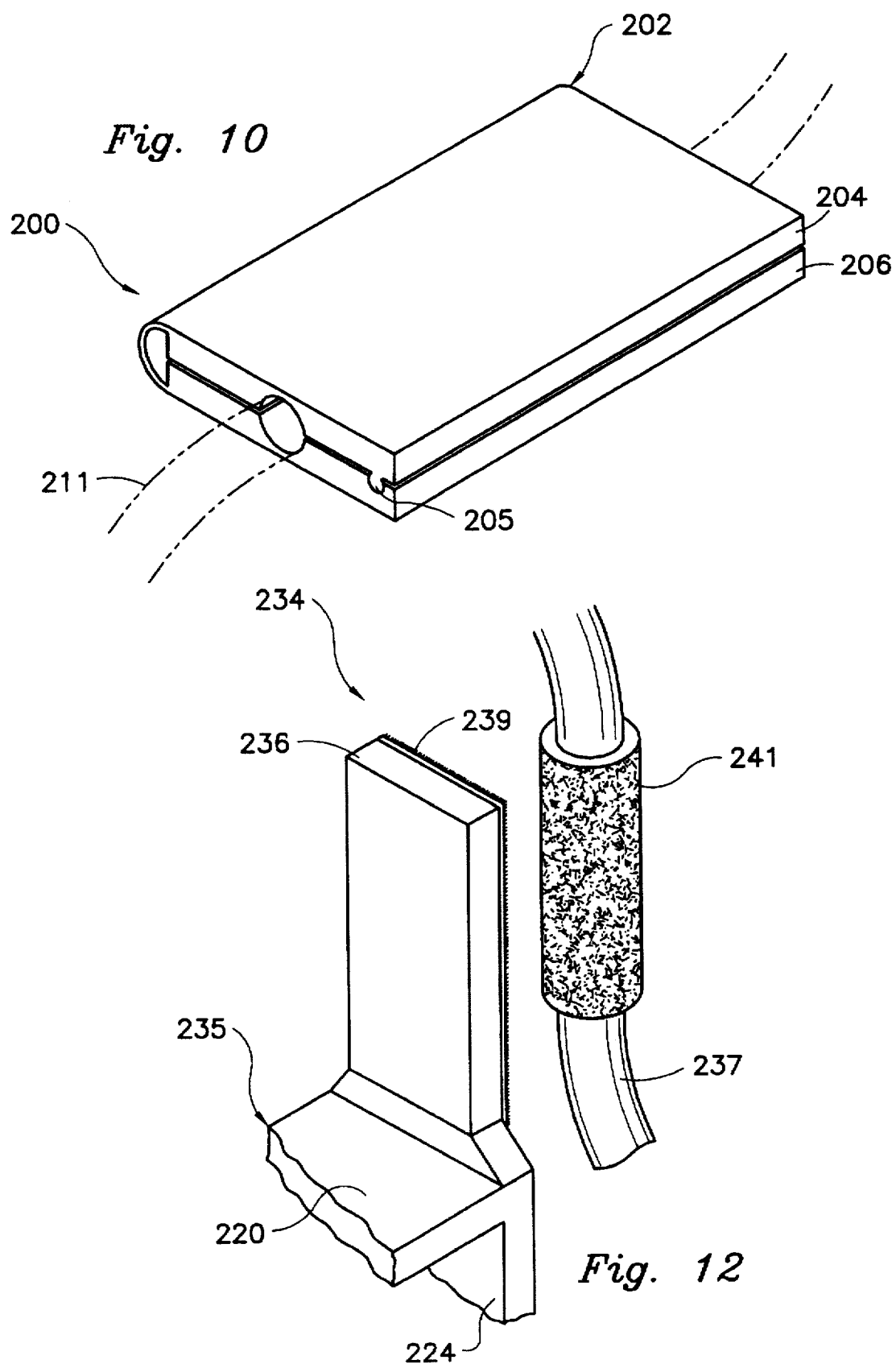
FIG. 10 is a perspective view depicting another embodiment of the device of the present invention attached to a partially cut away portion of the mouse cord.

Another embodiment of the present invention is depicted in FIG. 10 and shown generally as device 200. The frictional engaging means is a book member 202 which comprises an upper portion 204 folded over a lower portion 206. A circular opening extends longitudinally from the center of the front end to the rear end of the book member 202. The mouse cord 211 is inserted into the circular opening. In order to secure the mouse cord to the device, the upper portion 204 may include an elongated ridge 205 extending longitudinally from the front end to the rear end and which snap fits into a corresponding longitudinal groove cut into the lower portion 206, thereby locking the upper portion 204 to the lower portion 206. The mounting means may include an adhesive layer applied to the bottom surface of the lower portion 206. After applying the adhesive layer, the book member 202 can then be mounted on a stationary surface such as a mouse pad, desk top or computer table. The book member 202 can also be secured to the support member 13 of the mounting means depicted in FIGS. 1, 2, and 3.

Figure 11:
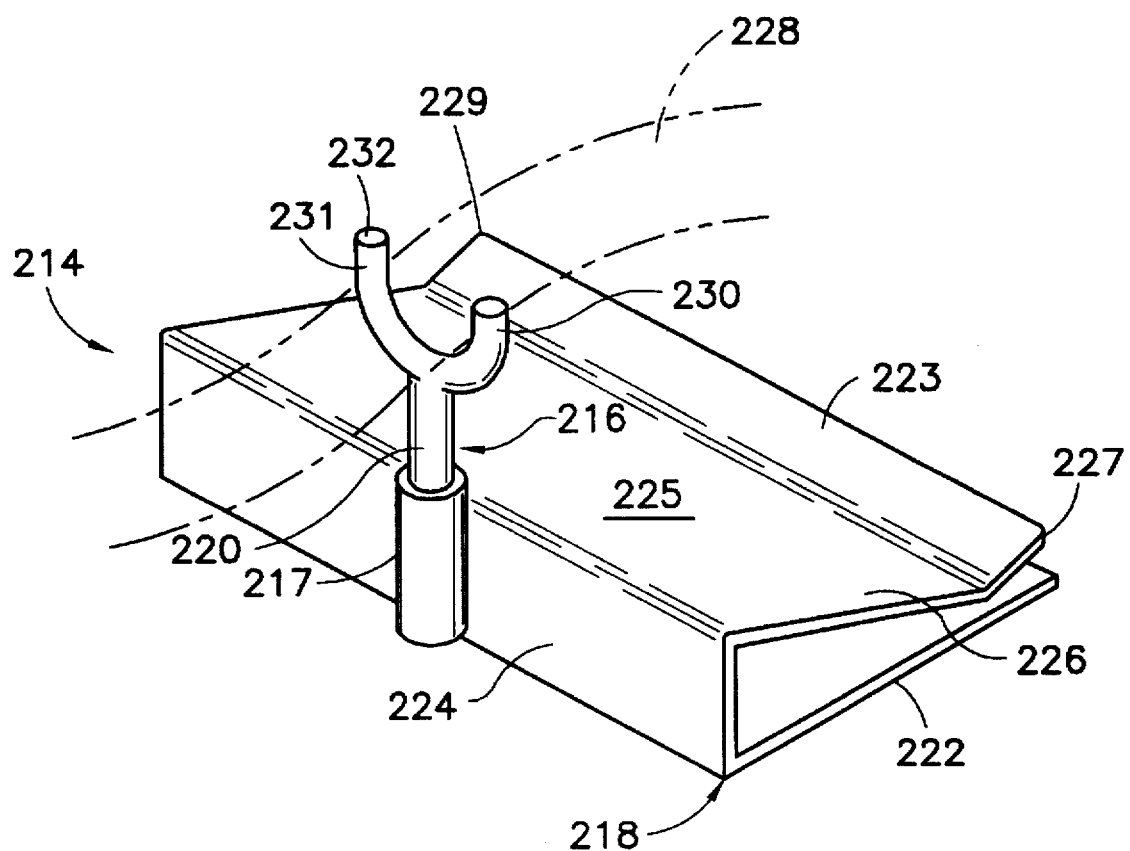
FIG. 11 is a perspective view depicting another embodiment of the device of the present invention attached to a partially cut away portion of the mouse cord.

Another embodiment of this invention is depicted in FIG. 11 and shown generally as device 214. Device 214 includes a yoke member 216 having a U-shaped upper member 232 and a base leg 220. The U-shaped upper portion 232 includes a pair of arms 230; each arm having an upper protrusion 231 projecting inwardly.

The base leg 220 of the yoke member 216 is inserted into a tubular receptacle 217, which is attached to the support member 224 of a mounting means 218. The mounting means further comprises a top member 225 integrally formed with the support member 224, and a base member 222 integrally formed with the lower edge of the support member 224 at slight acute angle and extending underneath the top member 225. Top member 225 is comprised of plate 226 having flange 223. The plate 226 is attached at an acute angle to the support member 224, and the flange 223 is attached at an obtuse angle to the plate 226 as shown in FIG. 11. The flange 223 has beveled corners 227 and 229 to prevent injury to device users from sharp flange corners.

The device is mounted onto a stationary object such as a mouse pad by sliding the mouse pad between the base member 222 and top member 225. The obtuse angle attachment of flange 223 to plate 226 allows for easy passage of the mouse pad between the base member 222 and top member 225. The arms 230 are flexed outwardly so that the mouse cord 228 can be inserted between upper protrusions 231 to rest in the crotch of the U-shaped portion 232. The upper protrusions 231 prevent the cord from moving upwardly out of the U-shaped portion 232. The device may be constructed of resilient polymeric materials or metals permitting the top member 225 and base member 222 to flex apart so that mouse pads of various thicknesses can be inserted between the top member 225 and base member 222 and to allow repeated insertion of the mouse cord into the U-shaped portion 232 of the yoke member 216.

Device 214 can also be utilized without a mouse pad by affixing the device to a surface by gluing or other affixing means and inserting mouse cord into the yoke member 216 to restrain the excess cord. Thus, device 214 allows a user to utilize a length of mouse cord needed to operate a computer mouse while restraining the remaining length of the mouse cord as described above. Device 214 also provides a separable two-piece design which facilitates attachment of labels and allows printing or engraving on the base member 222.

Another embodiment of this invention is shown generally as device 234 in FIG. 12. Device 234 is comprised of an upright pad 236 integrally formed with a mounting means 235. The cord 237 is attached to the pad by utilizing a hook and pile fastener such as VELCRO. In particular, one surface of the pad 236 comprises a dense layer 239 of tiny nylon hooks which is detachably mounted to a dense layer 241 of nylon pile disposed around the mouse cord 237. The mounting means 235 is of the same construction as of the type described in the embodiment shown in FIG. 12. The pad extends upwardly from the intersection of the top member 220 and support member 224 as shown in FIG. 12.

Figure 13:
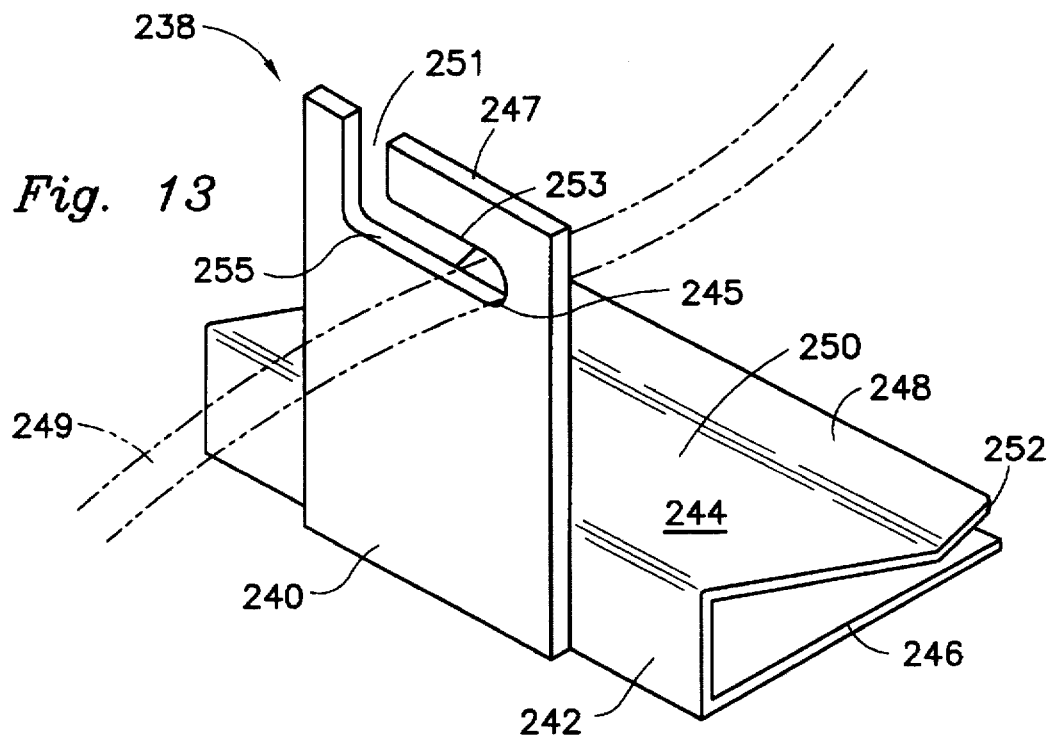
FIG. 13 is a perspective view depicting another embodiment of the device of the present invention attached to a partially cut away portion of the mouse cord.

Another embodiment of the invention is shown generally as device 238 in FIG. 13. Device 238 is comprised of an rectangular plate 240 attached to the mounting means. The plate has an L-shaped opening 251 extending downwardly from the top edge 247 near the left side and then across but not through the right edge of the plate 240 terminating in a rounded end 245 as shown in FIG. 13. The plate 240 is secured to the support member 242 of the mounting means.

The mounting means may include a top member 244 integrally formed with the support member 242 and a base member 246 integrally formed with the lower edge of the support member 242 at a slight acute angle and extending underneath the top member 244. Top member 244 comprises a plate 250 having a flange 248. The plate 250 is attached at an acute angle to the support member 242, and the flange 248 is attached at an obtuse angle to the plate 250 as shown in FIG. 13. The flange 248 has beveled corners 252 to prevent injury to device users from sharp flange corners. The device is mounted onto a stationary object such as a mouse pad by sliding the mouse pad between the base member 246 and top member 244. The obtuse angle attachment of flange 248 to plate 250 allows for easy passage of the mouse pad between the base member 246 and top member 244. The mouse cord 249 is inserted through the L-shaped opening 251 so that it abuts the rounded end 245. The opposing upper and lower edges 253, 255 of the L-shaped opening 251 pinch the cord securing it therein. The device may be constructed of resilient polymeric materials or metals permitting the top member 244 and base member 246 to flex apart so that mouse pads of various thicknesses can be inserted between the top member 244 and base member 246 and to allow repeated insertion of the mouse cord into the L-shaped opening 251 of plate 240.

Device 238 can also be utilized without a mouse pad by affixing the device to a surface by gluing or other affixing means and inserting the mouse cord into the L-shaped opening 251 of the plate 240 to restrain the excess cord. Thus, device 238 allows user to utilize a length of mouse cord needed to operate the remaining length of the mouse cord as described above.

Figure 14:
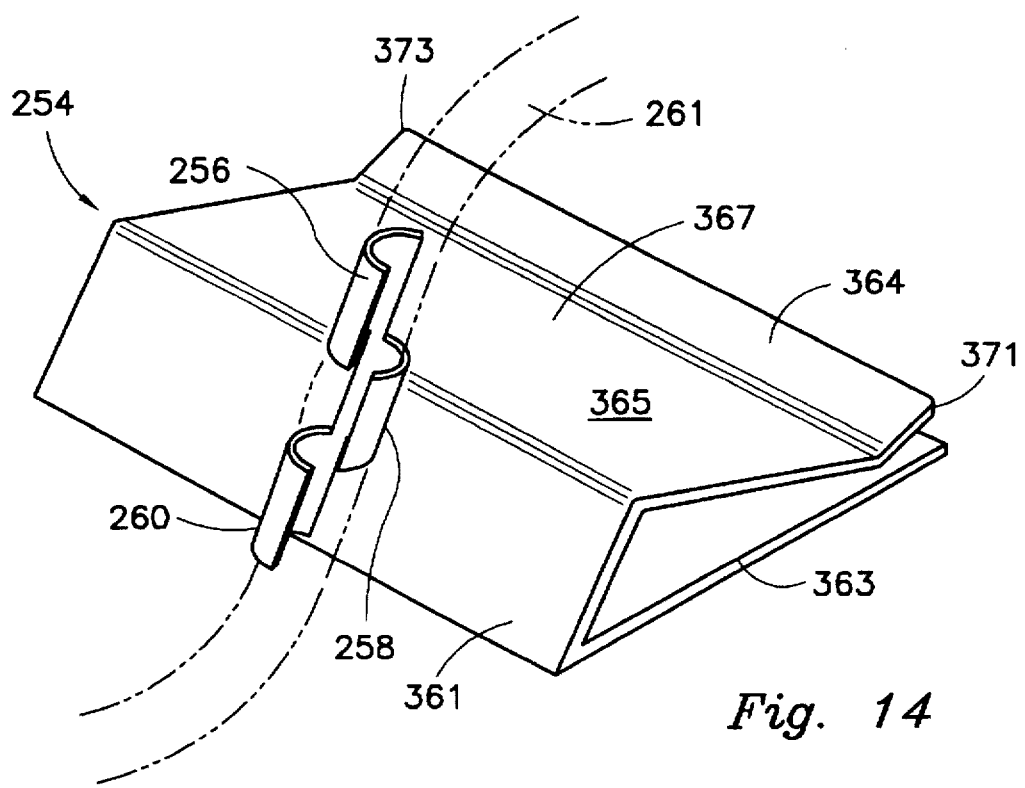
FIG. 14 is a perspective view depicting another embodiment of the device of the present invention attached to a partially cut away portion of the mouse cord.

Another embodiment is shown in FIG. 14 and depicted generally as device 254. Device 254 comprises an upper, middle, and lower arcuate-shaped troughs 256, 258, and 260, respectively, attached to a support member 361 of mounting means. The upper and lower troughs 256,260 face the right direction and the middle trough 258 faces the left direction. The troughs are aligned with each other on the support member 361 so that their interior sidewalls form a channel extending longitudinally. The mounting means further comprises a top member 365 integrally formed with the support member 361 and a base member 363 integrally formed with the lower edge of the support member 361 at an acute angle and extending underneath the top member 365. Top member 365 comprises a plate 367 having a flange 364. The plate 367 is attached perpendicular to the support member 361, and the flange 364 is attached at an obtuse angle to the plate 367 as shown in FIG. 14. The flange 364 has beveled corners 371 and 373 to prevent injury to device users from sharp flange corners. The device is mounted onto a stationary object such as a mouse pad by sliding the mouse pad between the base member 363 and top member 365. The obtuse angle attachment of flange 364 to plate 367 allows for easy passage of the mouse pad between the base member 363 and top member 365.

The mouse cord 261 is inserted through the channel and secured therein. The device may be constructed of resilient. The device is constructed of resilient polymeric materials or metals permitting the top member 365 and base member 363 to flex apart so that mouse pads of various thicknesses can be inserted between the top member 365 and base member 363 and to allow repeated insertion of the mouse cord into the channel.

Device 254 can also be utilized without a mouse pad by affixing the device to a surface by gluing or other affixing means and inserting the mouse cord into the channel to restrain the excess cord. Thus, device 254 allows user to utilize a length of mouse cord 261 needed to operate the remaining length of the mouse cord 261 as described above.

Another embodiment of this invention is shown generally as device 264 in FIG. 15. Device 264 comprises a shackle member 268 integrally formed at an obtuse angle with a vertical support member 270. The support member 270 is shaped generally like a trapezoid with the shackle 268 attached to the upper end of the support member 270. A horizontal base plate 296 is integrally formed with the lower end of the support member 270 and extends frontwardly. An engageable member defining a rectangular plate 294, parallel to the support member 270, is integrally formed at its center with the front end of the base plate 296.

A vertical triangular plate or support member 271, oriented perpendicular to the vertical support member 270, is attached to the center of the front surface of the support member 270 and also to the top surface of the base plate to laterally support the shack member 268 from the weight of the mouse cord. The shackle member 268 may be comprised of a partially cylindrical body 272 having flared lips 274 extending longitudinally on body 272 as shown in FIG. 15.

The mouse pad 278 to which this device is detachably mounted to includes a hump or raised front portion which functions as a wrist rest 280. The front end of the wrist rest 280 has a lower flange 282 projecting inwardly to provide more support from additional weight upon the wrist rest.

The rear portion of the mouse pad 278 is a flat base member 284 integrally formed with the wrist rest 280 at an obtuse angle and rests upon a supporting surface.

A track member 286 is attached on the rear end of the mouse pad. The track member 286 includes an upper L-shaped flange 238 and a lower L-shaped flange 290 integrally joined to a web 292 to form a C-shaped channel 293 that extends along the rear end. The mouse cord is inserted between the lips 274 and into the partially cylindrical shackle body 268 to secure mouse cord to device.

The device 264 is mounted to the mouse pad 278 by sliding the rectangular plate 294 into the channel. The device is secured in place by the downward extending lip 300 of the upper flange 288 and the upward extending lip 302 of the lower flange 290 covering the rectangular plate 294.

The device can also be utilized by affixing the plate to the mouse pad by gluing or other affixing means and inserting the mouse cord into the shackle to restrain the excess cord. Thus, the device allows a user to utilize a length of mouse cord needed to operate a computer mouse while restraining the remaining length of the mouse cord as described above. The device may be constructed of resilient polymeric materials or metals permitting repeated insertion of the mouse cord in the shackle.

In another embodiment shown in FIG. 16, device 304 is comprised of a shackle member 306 integrally formed with the mouse pad 308. The mouse pad 308 includes a hump or raised front portion which functions as a wrist rest 310. The rear portion of the mouse pad is a flat base member 316 integrally formed with the wrist rest 310 at an obtuse angle and rests upon a supporting surface. The shackle member 306 may include a partially cylindrical body 318 having flared lips 320 extending longitudinally on the body as shown in FIG. 16. The shackle member 306 is attached upon an outwardly projecting V-shaped extension 322 at the front end of the mouse pad 308. The shackle member 306 is also attached upon a beveled side edge of a vertical triangular support member 324. The support member 324 is secured upon the top surface of the extension 322 and, thus, prevents the shackle member 306 from bending due to the added weight of the mouse cord.

Device 304 may be constructed of resilient polymeric materials or metals to allow repeated insertion of the mouse cord into the shackle. Thus, device allows a computer mouse user to move the length of the mouse cord extending from the shackle member 306 to the mouse, which is necessary to operate a computer mouse, while controlling the movement of excess cord extending from the shackle to the back of the computer. This prevents the excess cord from causing spills and cord entanglement when the computer mouse is moved.

Figure 17:
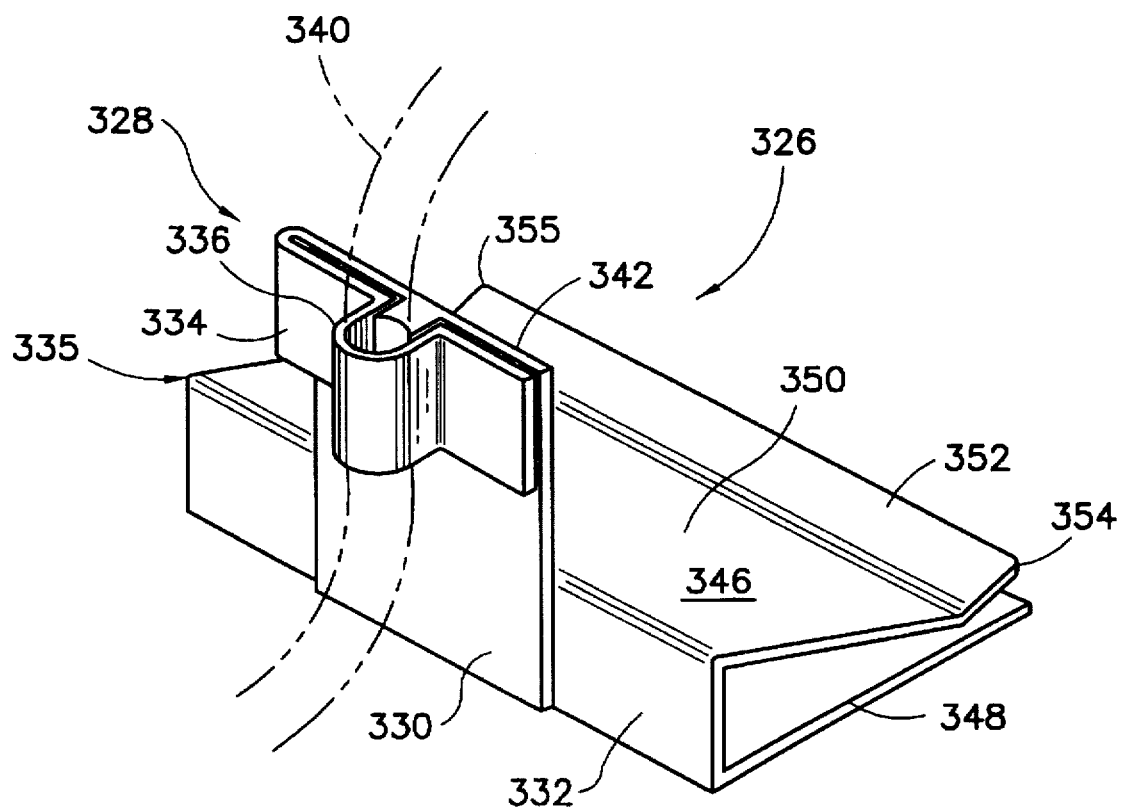
FIG. 17 is a perspective view depicting another embodiment of the present invention.

Another embodiment of this invention is shown generally as device 326 in FIG. 17. Device 326 is comprised of a slightly inclined holder 328 attached to the mounting means. The holder 328 includes a rectangular plate 330 attached to the support member 332 of the mounting means 335. An upper extension 334 is folded over the upper portion of the plate 330. The extension 334 has a partial cylindrical hump 336 at its center which forms an opening in which a mouse cord 340 is inserted therethrough. In order to secure the mouse cord 340 to the device, the extension 334 has a ridge 342 extending longitudinally which snap fits into a corresponding longitudinal groove formed in the plate 330 to lock the extension to the plate. The mounting means further comprises a top member 346 integrally formed with the support member 332 and a base member 348 integrally formed with the lower edge of the support member 332 at an acute angle and extending underneath the top member 346. The top member 346 comprises a plate 350 having a flange 352. The plate 350 is attached at an obtuse angle to the plate 350 as shown in FIG. 17. The flange 352 has bevelled corners 354 and 355 to prevent injury to device users from sharp flange corner. The device is mounted onto a stationary object such as a mouse pad by sliding the mouse pad between the base member 348 and top member 346. The obtuse angle attachment of flange 352 to plate 350 allows for easy passage of the mouse pad between the base member 348 and top member 346. The device 326 may be constructed of resilient polymeric materials or metals permitting the top member 346 and base member 348 to flex apart so that mouse pads of various thicknesses can be inserted between the top member 346 and base member 348 to allow repeated insertion of the mouse cord 340 into the opening.

Device 326 can also be utilized without a mouse pad by affixing the device 326 to a surface by gluing or other affixing means and inserting the mouse cord 340 into the opening 338 to restrain the excess cord. Thus, device 326 allows a portion of the mouse cord 340 to be utilized as needed to operate the remaining length of the mouse cord 340 as described above.

Thus, the present invention provides a device which limits the movement of computer mouse cord to a length necessary to operate a computer mouse while restraining the movement of the remaining mouse cord length. This is accomplished by allowing the length of mouse cord between the mouse and the frictional engaging means to be moved while the length of cord between the frictional engaging means and the computer is held stationary by the device. The device prevents mouse cord tangling and spills caused by the movement of excess cord between the frictional engaging means and the computer during computer mouse use. The device may be constructed of resilient materials such as metals and/or polymeric materials to allow repeated insertions of mouse cord into the frictional engaging means, and is mountable to various stationary objects such as mouse pads and desks. Typical device construction materials include but are not limited to metals such as aluminum, tin, or steel, and polymers such as polyethylene, polypropylene, or acrylonitrile-butadiene-styrene copolymers.

While the preferred embodiments have been fully described and depicted for the purposes of explaining the principles of the present invention, it will be appreciated by those skilled in the art that modifications, substantiations, and changes may be made thereto without departing from the scope of the invention set forth in the appended claims.

We claim:

1. A device for controlling movement of a mouse cord connected between a computer and a computer mouse, operated on a computer mouse pad, said device comprising:

an engaging means for engaging said mouse cord at a point along a length of said cord to provide for movement of a portion of said cord extending from said engaging means to said computer mouse while restraining a portion of said cord between said computer mouse and said computer, and a mounting means attached to said engaging means for mounting said device on said computer mouse pad, said mounting means comprising:

a vertical support member connected to said engaging means for elevating said engaging means above said computer mouse pad;

a base member for attaching said mouse cord control device to said computer mouse pad, said base member being movably attached to said vertical support member to allow lateral movement of said engaging means and said vertical support member in relation to said base member and said computer mouse pad.

2. A device for controlling the movement of a computer mouse cord comprising:

a shackle for engaging said mouse cord;

a mouse pad, said mouse pad having a track member extending along an edge thereof, and an engageable member attached to a lower portion of said shackle for slidable engagement with said track member, securing said shackle to said mouse pad.

3. The device of claim 2 wherein said track member includes an upper and lower flanges being constructed and arranged to form a C-shaped channel.

4. The device of claim 2 wherein said mouse pad has an elevated rear portion defining a wrist rest.

5. The device of claim 2 wherein said shackle is attached to a first support member, a base member attached between said support member and said engageable member, a second support member having one edge attached upon said base member and another edge attached to said first support member.

6. The device of claim 1 or 5 wherein said base member is rectangular.

7. The device of claim 1 wherein said engaging means comprises a partially cylindrical body.

8. The device of claim 1 or 2 wherein said device is constructed of polymeric materials.

* * * * *